US008566905B2

(12) United States Patent
Tanaka (10) Patent No.: US 8,566,905 B2
(45) Date of Patent: Oct. 22, 2013

(54) ELECTRONIC DEVICE, USE RESTRICTION METHOD FOR ELECTRONIC DEVICE, AND COMPUTER-READABLE RECORDING MEDIUM

(75) Inventor: Hiroyuki Tanaka, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 13/033,397

(22) Filed: Feb. 23, 2011

(65) Prior Publication Data

US 2011/0222100 A1    Sep. 15, 2011

(30) Foreign Application Priority Data

Mar. 12, 2010   (JP) .................................. 2010-056703

(51) Int. Cl.
*G06F 21/00*    (2013.01)
(52) U.S. Cl.
USPC .............................................. 726/2; 726/30
(58) Field of Classification Search
USPC .................... 713/165; 726/2, 30; 358/1.1, 1.4
See application file for complete search history.

(56) References Cited

U.S. PATENT DOCUMENTS

| 7,916,317 B2 * | 3/2011 | Kitamura ..................... 358/1.14 |
| 2005/0007619 A1 | 1/2005 | Minato |
| 2006/0158675 A1 * | 7/2006 | Morita ......................... 358/1.13 |
| 2006/0288303 A1 * | 12/2006 | Tachihara et al. ............. 715/781 |
| 2009/0009804 A1 | 1/2009 | Matsuda |
| 2009/0300757 A1 | 12/2009 | Tanaka et al. |

FOREIGN PATENT DOCUMENTS

| JP | 2003-323269 | 11/2003 |
| JP | 2005-011321 | 1/2005 |
| JP | 2007-018056 | 1/2007 |
| JP | 2007-142574 | 6/2007 |
| JP | 2007-156698 | 6/2007 |
| JP | 2008-204270 | 9/2008 |
| JP | 2009-289164 | 12/2009 |

\* cited by examiner

*Primary Examiner* — Ali Abyaneh
(74) *Attorney, Agent, or Firm* — IPUSA, PLLC (57) ABSTRACT

An electronic device includes a display part, a system control part for designating a display target to be displayed by the display part and switch the display target to another display target, a display control part for instructing the display part to display an operation screen corresponding to the display target designated by the system control part, and a receiving part for receiving a request for initiating the exclusive use of the display part from a use restriction application and receiving a request for terminating the exclusive use of the display part from the use restriction application. In a case where the receiving part receives the request for initiating the exclusive use of the display part, the system control part ceases switching the display target to the other display target until the receiving part receives the request for terminating the exclusive use of the display part.

9 Claims, 5 Drawing Sheets

| APPLICATION ID OF SCANNER APPLICATION | SCREEN DATA OF SCANNER APPLICATION |
|---|---|
| APPLICATION ID OF PRINTER APPLICATION | SCREEN DATA OF PRINTER APPLICATION |
| APPLICATION ID OF COPIER APPLICATION | SCREEN DATA OF COPIER APPLICATION |
| APPLICATION ID OF FACSIMILE APPLICATION | SCREEN DATA OF FACSIMILE APPLICATION |
| APPLICATION ID OF SDK PLATFORM | SCREEN DATA OF ACTIVE SDK APPLICATION | ical Laid-Open Patent Publication No. 2009-289164). For example,
ELECTRONIC DEVICE, USE RESTRICTION METHOD FOR ELECTRONIC DEVICE, AND COMPUTER-READABLE RECORDING MEDIUM

BACKGROUND OF THE INVENTION

1. Field of the Invention

The present invention relates to an electronic device, a use restriction method for the electronic device, and a computer-readable recording medium.

2. Description of the Related Art

Various use restriction functions are provided even for embedded machines such as image forming apparatuses. One representative example of a use restriction function is an authentication function (see, for example, Japanese Laid-Open Patent Publication No. 2009-289164). For example, with the authentication function, an unauthorized user can be partially or completely restricted from using the functions of an image forming apparatus.

Typically, so-called ready-made structures, which are embedded to machines beforehand, are used for implementing the use restriction function. Compared to general-purpose computers, implementing a use restriction function unique to the user and the user's situation is particularly difficult for machines having little degree of freedom for implementing software.

SUMMARY OF THE INVENTION

The present invention may provide an electronic device, a use restriction method for the electronic device, and a computer-readable recording medium that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an electronic device, a use restriction method for the electronic device, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an electronic device including: a display part; a system control part configured to designate a display target to be displayed by the display part and switch the display target to another display target; a display control part configured to instruct the display part to display an operation screen corresponding to the display target designated by the system control part; and a receiving part configured to receive a request for initiating an exclusive use of the display part from a use restriction application and receive a request for terminating the exclusive use of the display part from the use restriction application; wherein in a case where the receiving part receives the request for initiating the exclusive use of the display part, the system control part is configured to cease switching the display target to the other display target until the receiving part receives the request for terminating the exclusive use of the display part.

Other objects, features and advantages of the present invention will become more apparent from the following detailed description when read in conjunction with the accompanying drawings.

DETAILED DESCRIPTION OF THE PREFERRED EMBODIMENTS

Next, embodiments of the present invention are described with reference to the accompanying drawings.

In the following embodiments, an image forming apparatus (e.g., multi-function machine, laser printer) is described as an example of an electronic device. It is, however, to be noted that the electronic device is not limited to an image forming apparatus. For example, the electronic device may also be various household electrical appliances.

Figure 1:
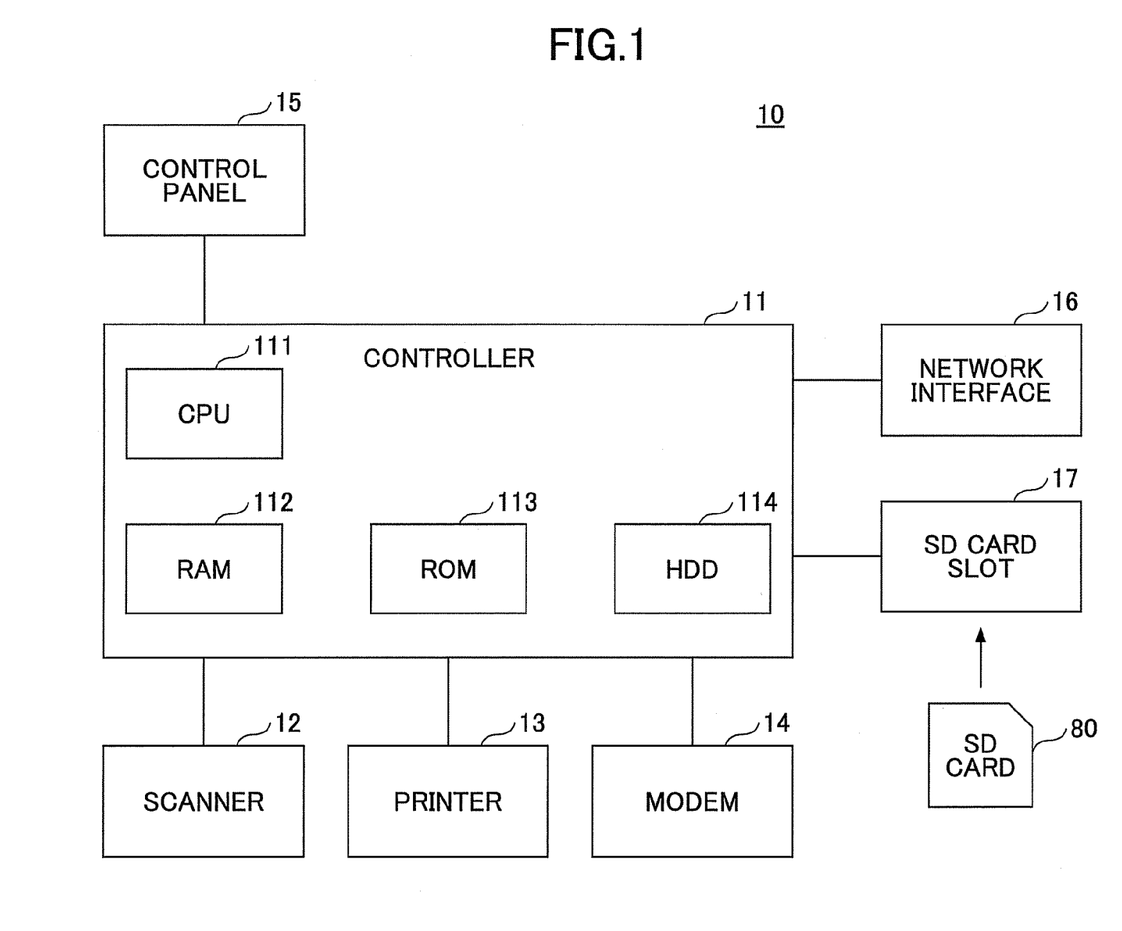
FIG. 1 is a schematic diagram illustrating a hardware configuration of an image forming apparatus according to an embodiment of the present invention.

FIG. 1 is a schematic diagram illustrating a hardware configuration of an image forming apparatus 10 according to an embodiment of the present invention. In FIG. 1, the image forming apparatus 10 includes hardware such as a controller 11, a scanner 12, a printer 13, a modem 14, a control panel 15, a network interface 16, and an SD card slot 17.

The controller 11 includes, for example, a CPU (Central Processing Unit) 111, a RAM (Random Access Memory) 112, a ROM (Read Only Memory) 113, and a HDD (Hard Disk Drive) 114. Various programs and data used by the programs are recorded in the ROM 113. The RAM 112 is used, for example, as a storage space for loading programs and a work space at which the loaded programs are processed. The CPU 111 achieves various functions of the image forming apparatus 10 by processing the programs loaded to the RAM 112. The HDD 114 is for storing various programs and data used by the programs.

The scanner 12 is for reading out image data from a document. The printer 13 is for printing print data to a sheet(s) of printing paper. The modem 14 is for connecting to a telephone line and exchanging (transmitting/receiving) image data by facsimile communications. The control panel 15 includes an input part (e.g., keys, touch panel) for receiving input from a user and a display part (e.g., a liquid crystal screen) for displaying data to the user. The network interface 16 is for connecting to a wired network and/or a wireless network (e.g., LAN (Local Area Network). The SD card slot 17 is for reading programs recorded to an SD card 80. In other words, the image forming apparatus 10 does not only execute programs recorded in the ROM 113. The image forming apparatus may also read out programs recorded in the SD card 80, load the programs to the RAM 112, and execute the programs loaded to the RAM 112. Further, other computer-readable recording media such as a USB (universal serial bus) memory or a CD-ROM may be used in addition to or as an alternative of the SD card 80.

Figure 2:
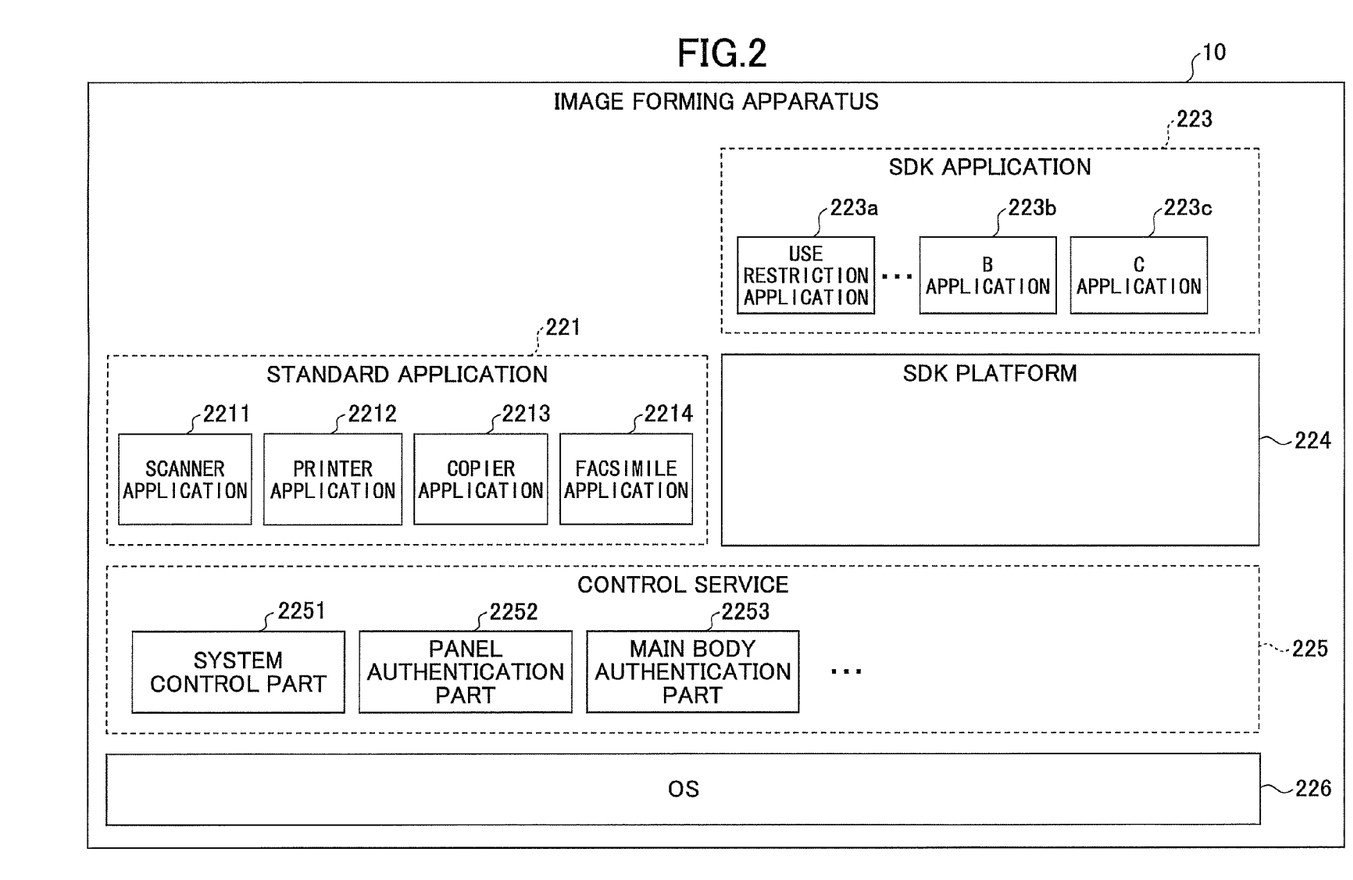
FIG. 2 is a schematic diagram illustrating a software configuration of an image forming apparatus according to an embodiment of the present invention.

FIG. 2 is a schematic diagram illustrating a software configuration of the image forming apparatus 10 according to an embodiment of the present invention. The image forming apparatus 10 illustrated in FIG. 2 includes, for example, a standard application 221, an SDK application 223, an SDK platform 224, a control service 225, and a OS (Operating System) 226.

Each of the software programs included in the image forming apparatus 10 is activated as a process or a thread by the OS 226.

The standard application 221 is an assembly of application programs implemented (beforehand during shipping) as a standard to the image forming apparatus 10. In FIG. 2, a scanner application 2211, a printer application 2212, a copier application 2213, and a facsimile application 2214 are included in the standard application 221. The scanner application 2211 executes scanning jobs. The printer application 2212 executes printing jobs. The copier application 2213 executes copying jobs. The facsimile application 2214 executes facsimile transmitting jobs or facsimile receiving jobs.

The control service 225 includes a group of software modules (software module group) for achieving functions such as a function commonly used by each application, a function for controlling operations of each application, a function for controlling various hardware resources and the like. In FIG. 2, a system control part 2251, a panel control part 2252, and a main body authentication part 2253 are provided as parts of the control service 225. In this embodiment, the system control part 2251 controls switching of operation screens of applications that are to be displayed (operated at) on the control panel 15. The application (technically, the operation screen of an application) that is to be displayed (operated at) on the control panel 15 is referred to as a display target (operation target). In this embodiment, two or more operation screens (applications) cannot be simultaneously displayed on the same control panel 15. Here, the applications include both the standard application 221 and the SDK application 223. Therefore, in a case where there is an operation screen of an application to be displayed on the control panel 15, the application is either the standard application 221 or the SDK application 223.

The panel control part 2252 instructs the displaying of an operation screen corresponding to each application to the control panel 15 in accordance with a switching instruction from the system control part 2251. The main body authentication part 2253 achieves a ready-made use restriction function that is embedded beforehand to the image forming apparatus 10. More specifically, the main body authentication part 2253 executes authentication of the user of the image forming apparatus 10 and permits the use of predetermined applications or the like to authenticated users only. Although detailed description is omitted, the main body authentication part 2253 can be customized. For example, a server that is used as an authentication engine can be switched. The scope for the customization is limited to a predetermined scope (predetermined setting items).

The SDK application 223 is an application program that is additionally installed to the image forming apparatus 10 after shipping of the image forming apparatus 10. That is, the SDK application 223 serves as a plug-in for expanding the functions of the image forming apparatus 10. In this embodiment, the SDK application 223 is implemented with Java (Registered Trademark) and is distributed in the format of an intermediate code (execution code). The intermediate code is referred to as Java (Registered Trademark) bytecode. Further, the SDK application 223 is used via a display component (GUI (Graphic User Interface)) displayed on a display part (e.g., screen) of the control panel 15. In FIG. 2, the SDK application 223 includes, for example, a use restriction application 223a, a B application 223b, and a C application 223c. The use restriction application 223a is an SDK application 223 implemented with a use restriction function that is unique to the user. The use restriction function that is unique to the user is a use restriction function that does not use the main body authentication part 2253. The degree of freedom regarding implementation of the SDK application 223 is significantly high compared to the degree of freedom regarding customization of a ready-made function of the image forming apparatus 10. Therefore, the content of the use restriction function of the use restriction application is not limited in particular. In this embodiment, the use restriction application 223a is an SDK application 223 implemented with an authentication function that is unique to the user.

The SDK platform 224 provides an environment for executing the SDK application 223. That is, the SDK platform 224 is an application platform of the SDK application 223. Each SDK application 223 is developed by using an API (Application Program Interface) provided by the SDK platform 224. The API of the SDK platform 224 is publicly available. Thus, the SDK application 223 can be developed by, for example, third party vendors. Specifically, the API is a group of, for example, functions and methods. In a broad sense, structures that report asynchronously occurring events to the SDK application 23 may also be included as an API.

From a standpoint of the control service 225, the SDK platform 224 is regarded as a single application equivalent to each standard application 221. More specifically, each standard application 221 is activated as an independent process by the OS 226. The SDK platform 224 is also activated as an independent process by the OS 226. Therefore, from the standpoint of the control service 225, each standard application and each SDK platform 224 is regarded as a process.

On the other hand, each SDK application 223 is activated as a thread inside the SDK platform 224. In other words, a thread is generated for each SDK application 223.

As described above, the SDK platform 224 hides (conceals) the SDK application 223 from the control service 225. Therefore, the control service 225 cannot directly control each SDK application 223. Only the SDK platform 224 can directly control each SDK application 223. The SDK platform 224 also hides (conceals) the control service 225 from each SDK application 223.

Figure 3:
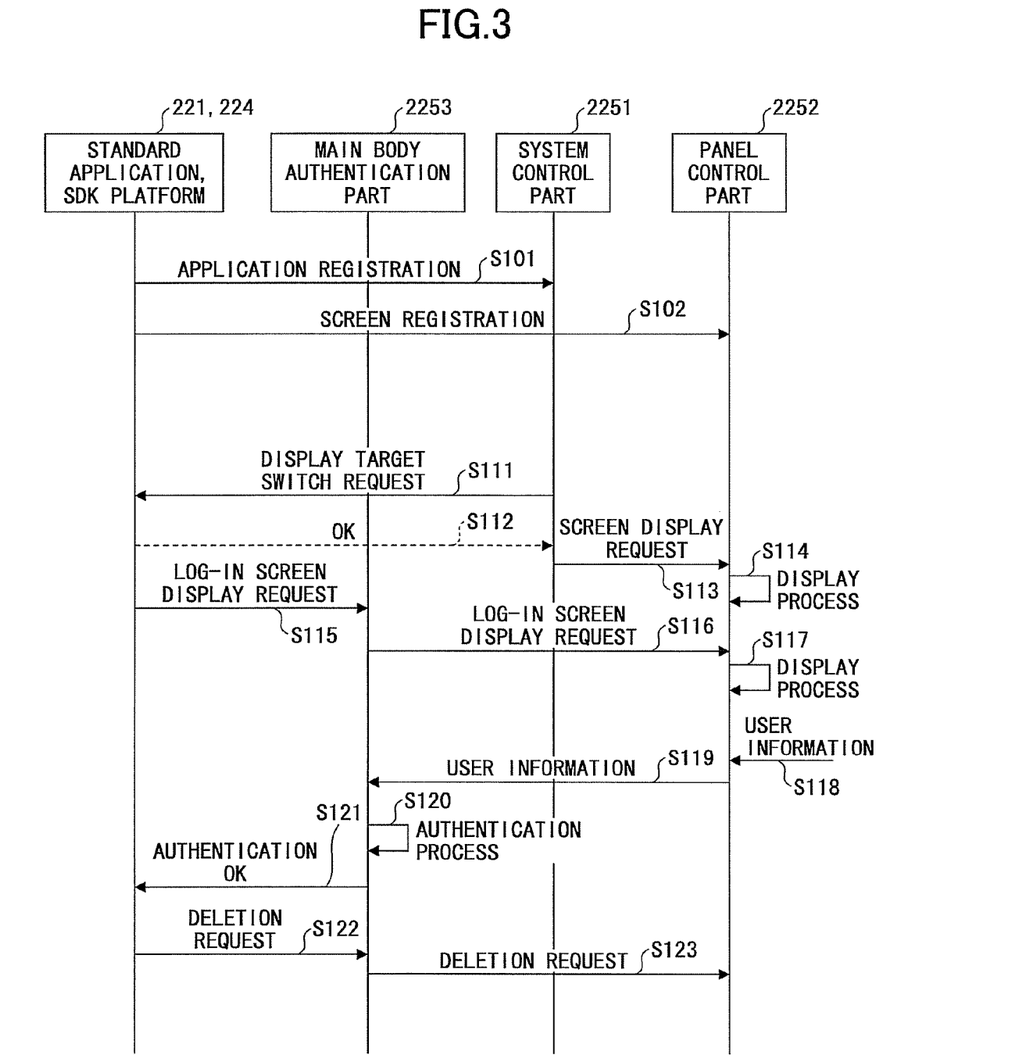
FIG. 3 is a sequence diagram for describing processes of a use restriction operation by a main body authentication part according to an embodiment of the present invention.

Next, processes performed by the image forming apparatus 10 according to an embodiment of the present invention are described. First, a use restriction operation performed by the main body authentication part 2253 is described. FIG. 3 is a sequence diagram for describing processes of the use restriction operation by the main body authentication part 2253. The processes illustrated in FIG. 3 are executed in a state where the use restriction application 223a is not installed in the image forming apparatus 10.

With reference to FIG. 3, when the image forming apparatus 10 is activated, each module of the control service 225 (system control part 2251, panel authentication part 2252, main body authentication part 2253), the standard application 221, and the SDK platform 224 are activated in this order as processes by the OS 226. Among the SDK applications 223 installed in the image forming apparatus 10, the SDK application 223 being set with automatic activation, is activated as a thread by the SDK platform 224. It is to be noted that SDK application 223 may be set with automatic activation or manual activation. In this embodiment, automatic activation is a type of activation in which a corresponding SDK application 223 is automatically activated when the image forming apparatus 10 is activated. In this embodiment, manual activation is a type of activation in which a corresponding SDK application 223 is activated according to an instruction input by the user via a management screen displayed in the control panel 15 in accordance with the SDK platform 224.

Each standard application 221 and the SDK platform 224 register their application ID (i.e. identification data being fixed to each standard application 221 and the SDK platform 224) and their process ID (i.e. identification data for communicating between processes) to the system control part 2251 (Step S101).

Then, each standard application 221 and the SDK platform 224 register their application ID and their screen data (i.e. data of a screen for operating each standard application 221 and the SDK platform 224) to the panel control part 2252 (Step S102). The panel control part 2252 manages the screen data in correspondence with the application ID. As a result, data can be managed by the panel control part 2252 in a manner illustrated in FIG. 4.

Figure 4:
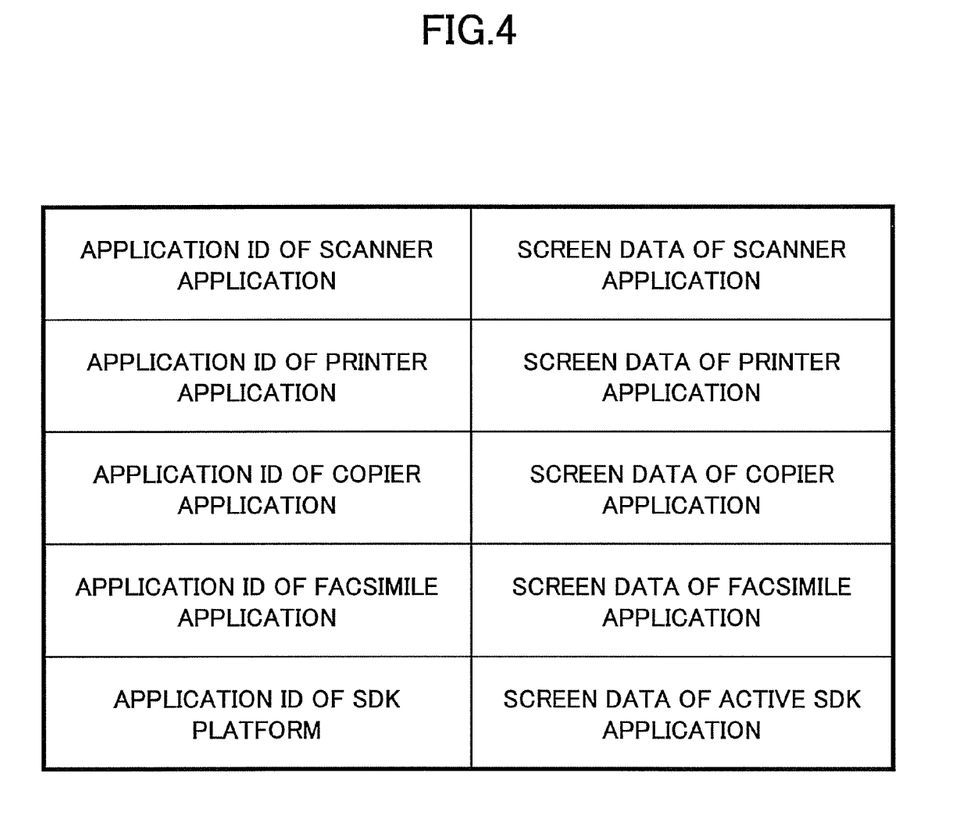
FIG. 4 is a table illustrating an example of screen data managed by a panel control part according to an embodiment of the present invention.

FIG. 4 is a table illustrating an example of screen data managed by the panel control part 2252. As illustrated in FIG. 4, the panel control part 2252 manages the screen data of the standard application 221 in correspondence with the application ID of the standard application 221. In a case where one of the SDK applications 223 is to be displayed, the SDK platform 224 registers the screen data of the SDK application 223 to be displayed. That is, the screen data of the SDK platform 224 are updated whenever one SDK application 223 to be displayed is switched to another SDK application 223 to be displayed. As illustrated in FIG. 4, the term "active" indicates that the SDK application 223 is in a state to be displayed (display target). In Step S102, the screen data to be registered by the SDK platform 224 may be the screen data of the SDK application 223 having highest display priority (i.e. screen data of the SDK application 223 to be displayed with highest priority according to a predetermined priority order) among the automatically activated SDK applications 223. Alternatively, the screen data registered by the SDK platform 224 may be blank.

The switching of active applications is not only performed upon (immediately after) activation of the image forming apparatus 10. That is, the switching of active applications is also performed on and after Step S111. Active applications can be switched by operating the hard keys (hereinafter also referred to as "function selection keys") arranged on the control panel 15. The function selection keys are provided in correspondence with the standard applications 221 and the SDK platform 224. Therefore, in this embodiment, the control panel 15 includes five function selection keys.

In Step S111, the system control part 2251 requests transition (switching) to a display state to the standard application 221 or the SDK platform 2224 that is to become a display target. The display target that is displayed immediately after activation of the image forming apparatus 10 is determined according to a predetermined priority order that is set beforehand to the system control part 2251. Further, in a case of switching from one active application to another, an application corresponding to the function selection key pressed by the user becomes the display target. The pressing of the function selection key is detected by the panel control part 2252. The panel control part 2252 associates key codes of the function selection keys with the application IDs of each application beforehand and manages the key codes of the function selection keys in correspondence with the application IDs of each application. Accordingly, by referring to a key code of the function selection key pressed by the user, the application ID corresponding to the key code can be identified. The panel control part 2252 reports the system control part 2251 of the identified application ID. Thereby, in accordance with the report from the panel control part 2252, the system control part 2251 can identify the application for requesting transition (switching) to the display target (display target transition request).

In a case where the standard application 221 or the SDK platform 224 receiving the display target transition request from the system control part 2251 is capable of making the transition to a display state (i.e. becoming a display target), the standard application 221 or the SDK platform 224 sends a response to the system control part 2251 accepting the request (Step S112). Whether the standard application 221 or the SDK platform 224 is capable of becoming a display target is determined according to, for example, the status of the hardware resources used by the standard application 221 and the SDK platform 224.

When the system control part 2251 receives the response of accepting the display target transition request, the system control part 2251 designates the application ID of the display target along with requesting the panel control part 2252 to display the screen of the application corresponding to the designated application ID (Step S113). Based on the designated application ID received together with the display request, the panel control part 2252 instructs the control panel 15 to display the operation screen of the application corresponding to the designated application ID (Step S114). Therefore, the control panel 15 displays the operation screen of the standard application 221 or the operation screen of one of the SDK applications 223.

It is to be noted that, in Step S112, the system control part 2251 does not switch the display target in a case where the system control part 2251 receives a response denying the display target request. However, immediately after the activation of the image forming apparatus 10, the system control part 2251 repeats the processes on and after Step S111 with respect to the standard application 221 that is next on the predetermined priority order.

Meanwhile, in the case where the standard application 221 or the SDK platform 224 accepts the display target request, the standard application 221 or the SDK platform 224 sends a log-in display request to the main body authentication part 2253 after sending a response accepting the display target transition request to the system control part 2251 (Step S115). In accordance with the log-in display request, the main body authentication part 2253 instructs the panel control part 2252 that a log-in screen is to be displayed on the control panel 15 (Step S116). The panel control part 2252, in response to the instruction from the main body authentication part 2253, instructs the control panel 15 to display a log-in screen in a manner superposed on the operation screen displayed in Step S114 (Step S117). The log-in screen is recognized as a special screen by the panel control part 2252. Therefore, even if an operation screen is being displayed in the control panel 15, the panel control part 2252 instructs the control panel 15 to display the log-in screen in a manner superposed on the operation screen. By superposing the log-in screen on the operation screen, the user is unable to use the application (e.g., standard application) corresponding to the operation screen displayed on the control panel 15. Thereby, a use restriction state of the image forming apparatus 10 is achieved.

Then, after the user inputs user data (e.g., user name and password) to the log-in screen displayed in control panel 15 (Step S118), the panel control part 2252 reports the user data to the main body authentication part 2253 having control over the log-in screen (Step S119). The main body authentication part 2253 performs an authentication process based on the user data (Step S120). In a case where the authentication is a success (i.e. user data is approved, authentication OK), the main body authentication part 2253 reports the success of the authentication process to the standard application 221 or the SDK platform 224 from which the log-in display request originated (Step S121).

Then, the standard application 221 or the SDK platform 224 having received the report of the success of the authentication process sends a log-in screen deletion request (i.e. a request for deleting the log-in screen) to the main body authentication part 2253 (Step S122). In accordance with the request from the standard application 221 or the SDK platform 224, the main body authentication part 2253 requests the panel control part 2252 that the log-in screen is to be deleted from the control panel 15 (Step S123). Then, in accordance with the request from the main body authentication part 2253, the panel control part 2252 deletes the log-in screen from the control panel 15 (i.e. cancels displaying of the log-in screen). As a result, the user is able to use the standard application 221 or the SDK application via the corresponding operation screen displayed by the Step S114. In other words, the use restriction state of the image forming apparatus 10 is released.

It is to be noted that, in a case of performing the processes on or after Step S111 after the successful authentication process (i.e. in a case where the function selection key is pressed after the successful authentication process), the main body authentication part 2253 may report the success of the authentication process without instructing the displaying of the log-in screen (Step S121). However, in a case where the log-in screen is desired to be displayed in correspondence with each standard application 221 or the SDK platform 224, the processes on or after Step S111 are repeated as described above.

Figure 5:
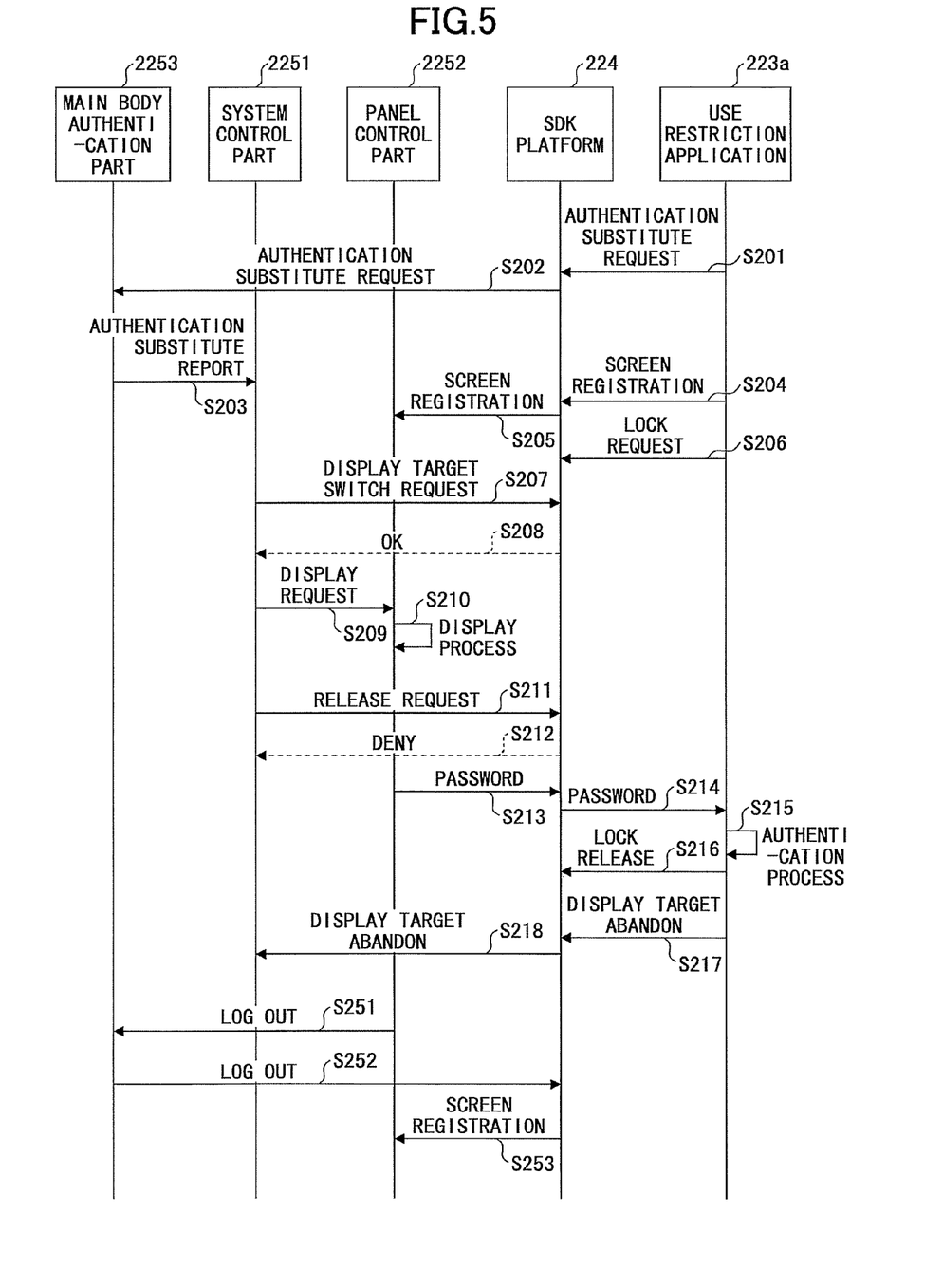
FIG. 5 is a sequence diagram for describing processes of a use restriction operation in a case where a use restriction application is installed in an image forming apparatus according to an embodiment of the present invention.

Next, a use restriction operation performed in a case where the use restriction application 223*a* is installed is described. FIG. 5 is a sequence diagram for describing processes of the use restriction operation in the case where the use restriction application 223*a* is installed. In FIG. 5, the processes performed in Steps S101 and S102 are omitted. In other words, the processes of Steps S101 and S102 are performed even in the case where the use restriction application is installed.

When the SDK platform 224 is activated, the use restriction application 223*a* sends an authentication substitute request (a request for authentication substitution) to the SDK platform 224 (Step S201). More specifically, the request for authentication substitution is a request for the SDK platform 224 to substitute the main body authentication part 2253 for achieving the use restriction function. In this embodiment, the use restriction application 223*a* is set with the above-described automatic activation. Accordingly, in Step S201, the process of sending the authentication substitute request is performed when the SDK platform 224 is activated upon the activation of the image forming apparatus 10.

Then, the SDK platform 224 sends the authentication substitute request to the main body authentication part 2253 (Step S202). A designation of the application ID of the SDK platform 224 is included in the authentication substitute request. In a case where the main, body authentication part 2253 receives the authentication substitute request, the main body authentication part 2253 invalidates its own use restriction function. For example, supposing that the main body authentication part 2253 receives a log-in screen display request, the main body authentication part 2253 does not instruct to display the log-in screen and reports success of the authentication process in response to the log-in display request.

Then, the SDK platform 224 designates the application ID according to the designation included in the authentication substitute request and reports to the system control part 2251 that authentication substitution is going to be performed (Step S203). The system control part 2251 stores the designated application ID as the identification data of the entity which is going to perform the authentication substitution (authentication substitution entity).

Meanwhile, after requesting the authentication substitution to the SDK platform 224, the use restriction application 223*a* designates its own identification data (hereinafter also referred to as "SDK application ID") and requests registration of its own screen data to the SDK platform 224 (Step S204). The SDK platform 224 designates its own application ID and requests registration of the screen data of the use restriction application 223*a* to the panel control part 2252 (Step S205). It is to be noted that the SDK platform 224 manages screen data in correspondence with the SDK application data. Further, the process of Step S205 may be performed as the process of Step S102 illustrated in FIG. 3.

Further, the use restriction application 223*a* designates its own identification data (SDK application ID) and sends a screen lock request (a request for locking a screen) to the SDK platform 224 (Step S206). More specifically, the screen lock request is a request for exclusive use of the display part of the control panel 15. The screen lock is a state where transition of screens (display targets) is prevented from occurring. The SDK platform 224 stores the designated SDK application ID included in the screen lock request as the origin of the screen lock request.

Then, the system control part 2251 sends a display target transition request to the SDK platform 224 (Step S207). The process performed in Step S207 corresponds to the process performed in Step S111 (see FIG. 3). However, in the operation illustrated in FIG. 5, screen data are not displayed in an order starting from the screen data having highest display priority. In the operation illustrated in FIG. 5, the display target is the SDK platform registered as the authentication substitution entity. That is, in a case where an authentication substitution entity is registered, the system control part 2251 displays screen data of the authentication substitution entity rather than displaying screen data of the application having highest priority order.

In a case where the SDK platform 224 receiving the display target transition request from the system control part 2251 is capable of making the transition to a display state (i.e. becoming a display target), the SDK platform 224 sends a response to the system control part 2251 accepting the request (Step S208). When the system control part 2251 receives the response of accepting the display target transition request, the system control part 2251 designates the application ID of the display target (in this case, application ID of the SDK platform 224) along with requesting the panel control part 2252 to display the screen of the application corresponding to the designated application ID (Step S209). Based on the designated application ID received together with the display request, the panel control part 2252 instructs the control panel 15 to display the operation screen of the application corresponding to the designated application ID (Step S210). Therefore, in this case, the control panel 15 displays the operation screen of the use restriction application 223*a* based on the screen data registered (in Step S205) in correspondence with the application ID of the SDK platform 224.

The content of the operation screen depends on the implementation of the use restriction application 223a. Further, the user restriction application 223a itself is merely one of the SDK applications 223. Therefore, the use restriction state of the image forming apparatus 10 cannot be achieved by merely displaying the operation screen of the use restriction application 223a because the operation screen of the standard application 211, for example, would be displayed if the function selection key is pressed. However, in this operation, screen lock is requested by the use restriction application in Step S206. Therefore, as described in detail below, the use restriction state of the image forming apparatus 10 is achieved in accordance with the screen lock request and the actions taken by the system control part 2251.

More specifically, in a case where the user presses a function selection key to switch from, for example, one standard application 211 to another standard application 211, the system control part 2251 sends a display target release request (a request for releasing a locked state of the display target) to the SDK platform 224 (Step S211). More specifically, the display target release request is to turn over the position of a display target to another application. The position of a display target is a position of exclusively using the display part of the control panel 15. In the case of receiving the display target release request where screen lock is requested, the SDK platform 224 sends a response denying the release of the display target (Step S212). In such case where the display target release request is denied, the system control part 2251 does not switch the display target. In other words, the processes performed on and after Step S111 in FIG. 3 are not performed when the display target release request is denied. Accordingly, until the use restriction application 223a releases the screen lock, the operation screen of the use restriction application 223a remains displayed on the display part of the control panel 15. In other words, the use restriction state with respect to other applications is achieved.

In this embodiment, the use restriction application 223a is implemented with an authentication function unique to the user. Therefore, the operation screen of the use restriction application 223a is an operation screen compatible to the authentication function unique to the user. The operation screen of the use restriction application 223a may be, for example, a screen to which a periodically changing password is input.

When the user inputs a password to the operation screen of the use restriction application 223a, the panel control part 2252 reports the password to the SDK platform 224 having control over the operation screen of the use restriction application (Step S213). Technically, the use restriction application 223a has control over the operation screen of the use restriction application. However, from the perspective of the panel control part 2252, the SDK platform 224 has control over the operation screen of the use restriction application (See FIG. 4).

Then, the SDK platform 224 reports the password to the use restriction application being the current display target (Step S214). The use restriction application 223a performs an authentication process based on the password reported from the SDK platform (Step S215). In a case where the authentication is a success (i.e. password is approved, authentication OK), the use restriction application 223a designates its own SDK application ID and requests the release of its locked screen to the SDK platform 224 (Step S216). That is, the use restriction application 223a requests to the SDK platform 224 that the exclusive use of the display part of the control panel 15 is to be terminated. In a case where the designated SDK application ID matches the SDK application ID stored as the origin of the screen lock request, the SDK platform 224 releases the lock of the screen. Accordingly, in a case where a function selection key is pressed in the state where the lock of the screen is released, the processes to be performed on or after Step S111 can be performed. However, because the use restriction function of the main body authentication part 2253 is in an invalidated state, the processes of Steps S116 through S120 are not performed. Therefore, the user can use other standard applications 221 or the like. In other words, the use restriction state of the image forming apparatus 10 is released.

It is to be noted that, in a case where the authentication process of Step S215 fails, the use restriction application 223a does not request the release of the lock of the screen. Accordingly, the use restriction state is maintained.

Then, the use restriction application 223a sends a display target abandon request to the SDK platform 224 (Step S217). The display target abandon request is a request indicating the abandonment of the position of the display target. Then, the SDK platform 224 designates its own application ID and requests abandonment of the display target to the system control part 2251 (Step. S218). In response to the request from the SDK platform 224, the system control part 2251 performs the processes to be performed on and after Step S111 (see FIG. 3). In this state, the display target is selected according to the predetermined priority order. Accordingly, because the SDK application 223 is capable of actively abandoning the position of the display target, transition of the operation screen can be automatically executed in correspondence with the release of the use restriction state.

Then, when a log-out key of the control panel 15 is pressed, the panel control part 2252 detects the pressing of the log-out key (log-out pressing incident). In response to the log-out pressing incident, the panel control part 2252 reports the log-out to the main body authentication part 2253 (Step S251). Then, the main body authentication part 2253 reports the log-out to the SDK platform 224, of the authentication substitute entity (Step S252). The SDK platform 224 registers screen data of the use restriction application 223a (Step S253). Then, the processes to be performed on or after Step S207 are performed. Then, the operation screen of the use restriction application 223a is displayed again on the control panel 15. In other words, the use restriction state of the image forming apparatus 10 reemerges.

It is to be noted that, the reason that the SDK platform 224 re-registers the screen data of the use restriction application 223a in Step S253 is because screen data of other SDK applications 223 may be registered in the panel control part 2252 during the period in which the use restriction is released.

Hence, with the above-described embodiments of the present invention, the SDK platform 224 is capable of accepting the authentication substitution request, the screen lock request, the screen lock release request, and the display target abandon request. That is, the SDK platform 224 has an API (Application Programming Interface) such as methods and functions for accepting each of the authentication substitution request, the screen lock request, the screen lock release request, and the display target abandon request. Therefore, by implementing the SDK application 223 using the API, the use restriction function unique to the user (e.g., use restriction application 223a) can be achieved.

In the above-described embodiments of the present invention, the type of use restriction is not to be limited to authentication. An SDK application having a given function can be discretionally determined by the user by using the API corresponding to the authentication substitution request, the screen lock request, the screen lock release request, and the display target abandon request. For example, the user can restrict the use of the image forming apparatus 10 during a predetermined time period by preventing the use restriction application 223a from requesting the lock release until a predetermined time arrives.

The present invention is not limited to the specifically disclosed embodiments, and variations and modifications may be made without departing from the scope of the present invention.

The present application is based on Japanese Priority Application No. 2010-056703 filed on Mar. 12, 2010, the entire contents of which are hereby incorporated herein by reference.

What is claimed is:

1. An electronic device comprising:
   a display part;
   a system control part that designates, by execution of a processor of the electronic device, a display target to be displayed by the display part and switch the display target to another display target;
   a display control part that instructs, by execution of the processor, the display part to display an operation screen corresponding to the display target designated by the system control part; and
   a receiving part that receives, by execution of the processor, a request, including an application identification data (ID), for initiating an exclusive use of the display part from a use restriction application and receives a request, including the application ID, for terminating the exclusive use of the display part from the use restriction application, the receiving part determining to permit the request for terminating the exclusive use after confirming that the application ID has not changed;
   wherein, upon detecting operation of another application having another application ID and another operation screen, the system control part sends a display target release request to the receiving part to turn over a position of exclusively using the display part to the other application,
   wherein in a case where the receiving part received the request for initiating the exclusive use of the display part, the system control part is configured to cease switching the display target to the other display target, requested by the other application, until the receiving part receives the request for terminating the exclusive use of the display part from the use restriction application.

2. The electronic device as claimed in claim 1, wherein the receiving part is configured to receive a request for abandoning the display target from the use restriction application, and wherein the system control part is configured to switch the display target to the other display target when the receiving part receives the request for abandoning the display target.

3. The electronic device as claimed in claim 1, further comprising:
   an input part that receives, by execution of the processor, a request for switching the display target from a user;
   wherein the system control part is configured to report the request for switching the display target to the receiving part;
   wherein in the case where the receiving part receives the request for initiating the exclusive use of the display part, the receiving part is configured to deny the request for switching the display target if the request for terminating the exclusive use of the display part is not received; and wherein the system control part is configured to cease switching the display target to the other display target if the request for switching the display target is denied.

4. A method for restricting use of an electronic device including a display part, the method comprising the steps of:
   a) designating a display target to be displayed by the display part;
   b) switching the display target to another display target;
   c) instructing the display part to display an operation screen corresponding to the display target designated in step a);
   d) receiving a request, including an application identification data (ID), for initiating an exclusive use of the display part from a use restriction application;
   e) receiving a request, including the application ID, for terminating the exclusive use of the display part from the use restriction application, and determining to permit the request for terminating the exclusive use after confirming that the application ID has not changed; and
   f) upon detecting operation of another application having another application ID and another operation screen, sending a display target release request to turn over a position of exclusively using the display part to the other application,
   wherein in a case where the request for initiating the exclusive use of the display part is received from the use restriction application, the switching of step b) is ceased until the request for terminating the exclusive use of the display part is received from the use restriction application.

5. The method as claimed in claim 4, further comprising a step of:
   receiving a request for abandoning the display target from the use restriction application, wherein the display target is switched to the other display target when the request for abandoning the display target is received.

6. The method as claimed in claim 4, further comprising the step of:
   receiving a request for switching the display target from a user;
   wherein in the case where the request for initiating the exclusive use of the display part is received, the request for switching the display target is denied if the request for terminating the exclusive use of the display part is not received; and
   wherein the switching of the display target to the other display target is ceased if the request for switching the display target is denied.

7. A non-transitory computer-readable recording medium on which a program is recorded for causing an electronic device including a display part to execute a method for restricting use of the electronic device, the method comprising the steps of:
   a) designating a display target to be displayed by the display part;
   b) switching the display target to another display target;
   c) instructing the display part to display an operation screen corresponding to the display target designated in step a);
   d) receiving a request, including an application identification data (ID), for initiating an exclusive use of the display part from a use restriction application;
   e) receiving a request, including the application ID, for terminating the exclusive use of the display part from the use restriction application, and determining to permit the request for terminating the exclusive use after confirming that the application ID has not changed; and f) upon detecting operation of another application having another application ID and another operation screen, sending a display target release request to turn over a position of exclusively using the display part to the other application, wherein in a case where the request for initiating the exclusive use of the display part is received from the use restriction application, the switching of step b) is ceased until the request for terminating the exclusive use of the display part is received from the use restriction application.

8. The non-transitory computer-readable recording medium as claimed in claim 7, wherein the method further comprises a step of:

receiving a request for abandoning the display target from the use restriction application, wherein the display target is switched to the other display target when the request for abandoning the display target is received.

9. The non-transitory computer-readable recording medium as claimed in claim 7, wherein the method further comprises a step of:

receiving a request for switching the display target from a user;

wherein in the case where the request for initiating the exclusive use of the display part is received, the request for switching the display target is denied if the request for terminating the exclusive use of the display part is not received; and wherein the switching of the display target to the other display target is ceased if the request for switching the display target is denied.

* * * * *